United States Patent [19]

Hirai

[11] Patent Number: 4,486,375
[45] Date of Patent: Dec. 4, 1984

[54] METHOD OF MANUFACTURING TOOTHED BELTS

[75] Inventor: Hideo Hirai, Kakogawa, Japan

[73] Assignee: Mitsuboshi Belting Ltd., Kobe, Japan

[21] Appl. No.: 469,024

[22] Filed: Feb. 23, 1983

[51] Int. Cl.³ .......................... B29D 3/02; B29D 31/00
[52] U.S. Cl. .................................... 264/254; 156/140; 264/257; 264/267
[58] Field of Search ........ 156/137, 138, 140, 137–140, 156/171, 192; 264/251, 257, 258, 250, 254, 267

[56] References Cited

U.S. PATENT DOCUMENTS

| | | | |
|---|---|---|---|
| 1,510,449 | 9/1924 | Brucker | 156/138 |
| 1,928,869 | 10/1933 | Roderwald | 156/192 |
| 2,507,852 | 5/1950 | Case | 156/140 |
| 2,865,046 | 12/1958 | Bird | 264/257 |
| 3,078,206 | 2/1963 | Skura | 156/140 |
| 3,473,989 | 10/1969 | Richmond | 156/138 |
| 3,580,762 | 5/1971 | Barnes et al. | 156/138 |
| 3,799,824 | 3/1974 | Arnao et al. | 156/139 |
| 3,894,900 | 7/1975 | Redmond | 156/138 |
| 3,897,291 | 7/1975 | Hoback et al. | 156/138 |
| 4,058,424 | 11/1977 | Breher | 156/137 |
| 4,066,732 | 1/1978 | Redmond | 156/138 |
| 4,251,306 | 2/1981 | Breher | 156/140 |
| 4,343,666 | 8/1982 | Wetzel | 156/138 |

FOREIGN PATENT DOCUMENTS 1011858 12/1965 United Kingdom ............... 156/138

Primary Examiner—Willard E. Hoag
Attorney, Agent, or Firm—Wood, Dalton, Phillips, Mason & Rowe

[57] ABSTRACT

A method of manufacturing a toothed belt including the steps of providing a cylindrical mold having a plurality of longitudinal circumferentially spaced grooves, providing a thin layer of settable material on the mold surface, preforming a fabric to define a corrugated reinforcement having projections complementary to the grooves, placing the corrugated fabric in fitted association about the mold, urging the fabric forcibly against the mold to cause accurate fit of the fabric in the grooves, maintaining the urging while causing the settable material to at least partially set on the fabric corrugations, wrapping a tensile cord about the fabric-covered mold, and forming a belt body about the tensile cord and in the corrugations on the fabric. The resultant toothed belt sleeve may be cut transversely at axially spaced positions to define individual toothed drive belts, as desired. In a modified form, filler pieces are provided in the grooves of the corrugated fabric to facilitate accurate fit of the fabric to the mold.

20 Claims, 12 Drawing Figures

METHOD OF MANUFACTURING TOOTHED BELTS

DESCRIPTION

1. Technical Field

This invention relates to drive belts and in particular to the manufacture of toothed belts.

2. Background Art

In one form of toothed drive belts, a reinforcing fabric is provided on the toothed surface of the belt to prevent cracks, such as at the tooth root, and thereby extend the useful life of the belt. Further, the use of the fabric causes the tooth to have an accurate preselected configuration for improved drive operation in use.

A common method of manufacture of such fabric reinforced toothed belts includes a first step of wrapping the reinforcing fabric endlessly around a cylindrical mold having a plurality of tooth grooves. Alternatively, the reinforcing fabric may be wound endlessly along the tooth groove of the mold.

A rope tension member is then spirally wound around the cylindrical mold and liquid urethane elastomer is poured into the spaces between the inner mold and an outer mold juxtaposed concentrically thereabout. Elastomer fills the tooth groove of the inner mold and forms a belt body about the rope tension member. After the elastomer sets, the molding is removed from the mold and the resultant toothed belt sleeve is cut at axially spaced intervals so as to divide the sleeve into a plurality of toothed belts.

Such manufacture has presented the serious problem of bubbles occurring in the reinforcing fabric as a result of the fabric being out of position relative to the mold during the introduction of the elastomer. Wrinkles and creases may form in the fabric and, thus, resulting in an imperfect belt construction wherein the fabric does not accurately define the desired toothed configuration. As indicated above, it is most important that the tooth configuration be accurately defined by the fabric in order to provide smooth belt drive operation.

DISCLOSURE OF INVENTION

The present invention comprehends an improved method of manufacture of such a toothed belt wherein the reinforcing fabric is preformed to define corrugations accurately corresponding to the desired tooth configuration. The preformed fabric is then placed on the mold with the corrugations fitted into the grooves of the mold so that when the elastomer is poured into the space between the inner and outer molds, the reinforcing fabric is maintained in accurate, seated engagement with the mold groove surface, thereby accurately defining the desired tooth configuration without bubbles, creases, etc.

More specifically, the present invention comprehends the improved method of manufacturing a toothed belt sleeve including the steps of providing a cylindrical mold having a plurality of longitudinal circumferentially spaced grooves, providing a thin layer of settable material on the mold surface, preforming a fabric to define a corrugated reinforcement having projections complementary to the grooves, placing the corrugated fabric in fitted association about the mold, urging the fabric forcibly against the mold to cause accurate fit of the fabric in the grooves, maintaining the urging while causing the settable material to at least partially set on the fabric corrugations, wrapping a tensile cord about the fabric-covered mold, and forming a belt body about the tensile cord and in the corrugations on the fabric.

In the illustrated embodiment, the settable material comprises a settable resin, such as polyurethane elastomer resin.

In the illustrated embodiment, the body of the belt is formed of a resin similar to that of the settable material.

In the illustrated embodiment, the settable material comprises a heat settable material and the step of causing the settable material to at least partially set comprises a step of applying heat thereto.

The novel method of manufacturing the toothed belt sleeve of the present invention is extremely simple and economical of construction while yet providing an improved facilitated belt manufacture.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 6:
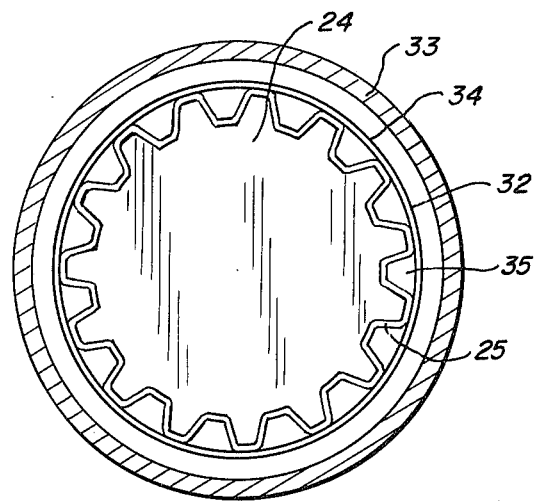
FIG. 6 is a transverse section illustrating the arrangement of the inner and outer molds for receiving the settable elastomer to define the belt body.
Figure 7:
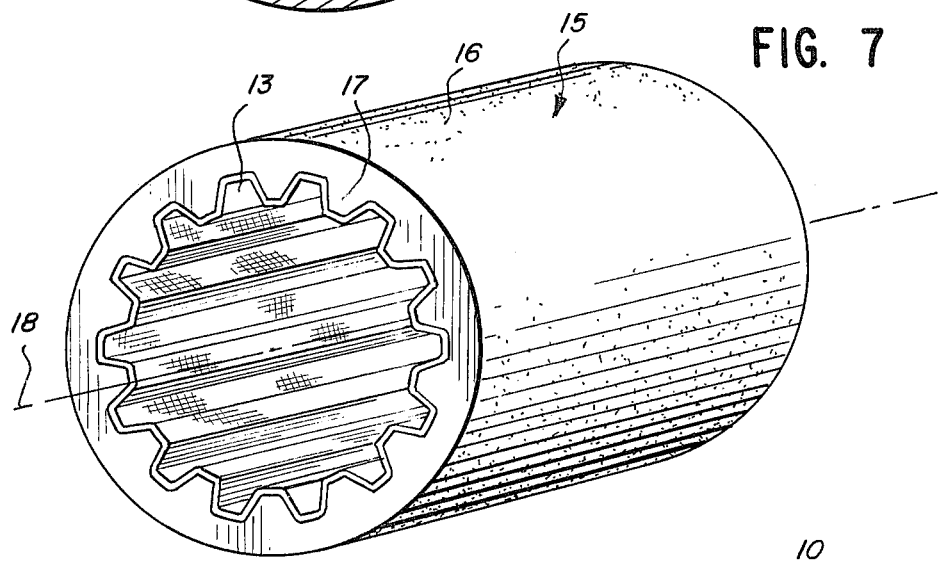
FIG. 7 is a perspective view of the resultant formed belt sleeve.
Figure 8:
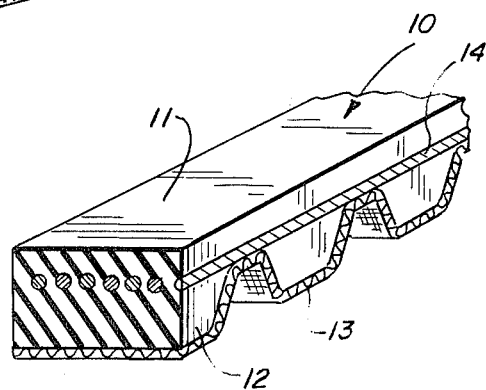
FIG. 8 is a fragmentary perspective view of a belt embodying the invention cut from the sleeve.

In the illustrative embodiment of the invention as shown in FIGS. 1–8 of the drawing, a toothed drive belt 10 is shown in FIG. 8 to include a belt body 11 provided with a plurality of inner teeth 12 covered by reinforcement fabric 13. Embedded in the belt body are spirally wrapped tensile cords 14 extending longitudinally of the belt. The present invention is concerned with a new and improved method of manufacturing such belts so as to provide the reinforcement fabric 13 in accurate desired toothed configuration and free of bubbles, wrinkles, etc., as have been found in such belt constructions in the prior art.

In the improved method of manufacture of such reinforced toothed belt, the belts are cut from a toothed belt sleeve 15 illustrated in FIG. 7. As shown in FIG. 7, the sleeve includes a tubular body portion 16 with the teeth 17 spaced circumferentially about an axis 18 of the cylindrical sleeve. The sleeve is then cut transversely at axially spaced positions to define the desired individual looped V-belts 10.

Figure 1:
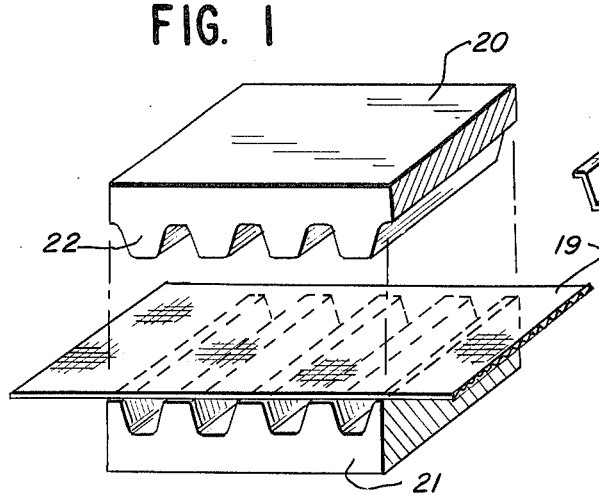
FIG. 1 is a perspective view illustrating a first step in the preforming of the fabric to define a corrugated reinforcement sheet.

The improved method of manufacturing the toothed belt sleeve 15 is illustrated in FIGS. 1 through 6. As shown in FIG. 1, in an initial step of manufacture, a reinforcing fabric sheet 19 is placed between a pair of complementary corrugated molds 20 and 21. The reinforcing fabric, in the illustrated embodiment, comprises an elastic fabric woven with crimped nylon warp and normal nylon weft yarns. Alternatively, the fabric may comprise unwoven or knitted cloth. However, it is preferred that where the cloth has a direction of elasticity, it be arranged so that that direction is at right angles to the longitudinal extent of teeth 22 of the molds 20 and 21. Polyurethane elastomer is applied to the surfaces of the cloth 19 prior to the cloth being pressed between the molds 20 and 21. The molds are heated and held under pressure until the elastomer applied to the fabric is set or hardened, whereupon the molds are removed and the corrugated reinforcing fabric 23 illustrated in FIG. 2 removed therefrom.

Figure 2:
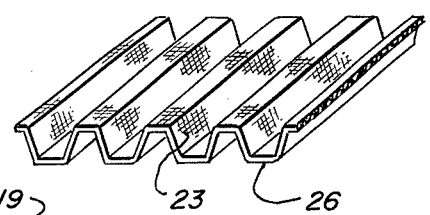
FIG. 2 is a perspective view of a portion of the corrugated reinforcement sheet.
Figure 3:
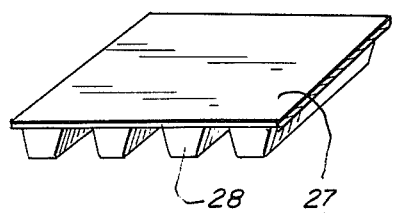
FIG. 3 is a perspective view of a preformed molding corresponding to the desired toothed configuration of the belt.

In lieu of the polyurethane elastomer, nitrile rubber with modified phenol resin, epoxy resin, etc., may be used in setting the fabric in the corrugated configuration illustrated in FIG. 2.

The corrugated fabric 23 is next wrapped about a mold 24 having a plurality of circumferentially spaced, axial grooves 25 opening radially outwardly to define the teeth 17 of the belt sleeve 15. Prior to the placement of the corrugated fabric 23 therein, the surface of mold 24 is provided with a thin layer of settable material, such as polyurethane elastomer. Ribs 26 of the corrugated fabric 23 correspond accurately to the grooves 25 and, thus, fit accurately into the grooves when the fabric is wrapped around the mold 24.

The fabric 23 is urged firmly into the grooves by a preformed mold 27 having a plurality of spaced teeth 28 accurately corresponding to the desired belt sleeve teeth 17.

Figure 4:
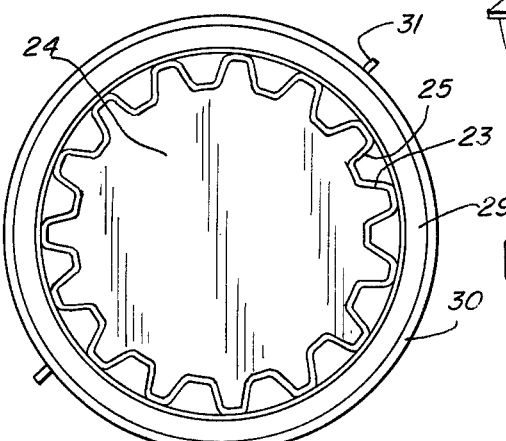
FIG. 4 is an end view of the mold with the preformed fabric wrapped thereabout and with the molding installed thereon to urge the fabric into the inner mold grooves, the assembly being installed concentrically within an outer cylindrical mold.

As shown in FIG. 4, the mold 27 is installed around the mold 24, with the fabric 23 wrapped therearound, so as to urge the fabric firmly and accurately into the mold grooves 25. An annular steam bag 29 is disposed concentrically about the mold 27 within an outer housing 30. Steam is delivered to bag 29 through an inlet 31 for heating the fabric 23 under pressure, thereby further firmly urging the fabric 23 into the grooves 25 of mold 24 and causing the thin film of resin previously provided on the mold 24 to set with the ribs 26 of the corrugated fabric 23 in accurate surface contact with the groove surfaces.

Figure 5:
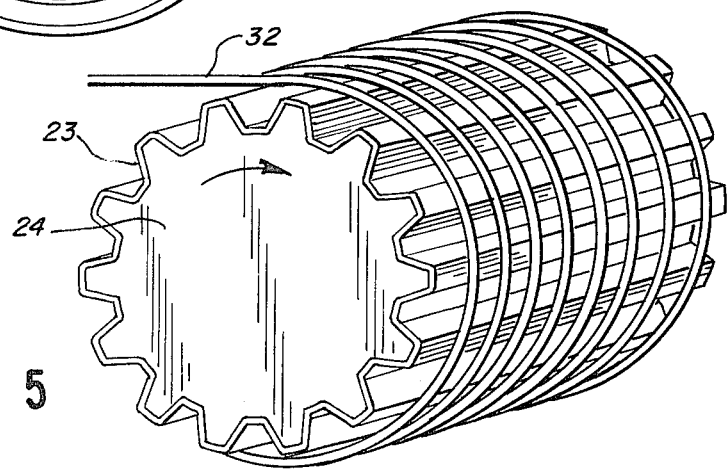
FIG. 5 is a perspective view illustrating the winding of the rope tension member about the inner mold, with the set fabric reinforcement provided thereon.

Upon completion of the setting of the fabric 23 in the grooves 25, housing 30, steam bag 29, and mold 27 are removed from about the fabric covered mold and a tensile cord 32 is spirally wrapped thereabout, as illustrated in FIG. 5. Tensile cord 32 comprises a rope member having low elongation and high strength, and illustratively may be formed of steel, polyester resin such as Teteron, nylon, etc.

Following the wrapping of the tensile cord about the fabric 23 and mold 24, a cylindrical mold 33 is concentrically disposed in outwardly spaced relationship thereto, as illustrated in FIG. 6, so as to define a radially outer annular space 34 outwardly of the tensile cord 32 and a plurality of radially inner tooth spaces 35. The opposite ends of the mold are closed permitting the moldable belt material, such as liquid urethane elastomer, to be poured into the spaces 34 and 35 embedding the tensile cords 32 and forming the outer belt body and teeth, as shown in FIG. 7. The urethane elastomer may be suitably set by curing under heat for a preselected period of time in the conventional manner.

The V-belts 10 are suitably cut from the sleeve to have a desired width, as illustrated in FIG. 8.

Referring now to the embodiment of FIGS. 9–12, a modified method of forming the toothed drive belt utilizes filler end pieces 36 in the grooves 37 of the corrugated fabric 23.

Figure 12:
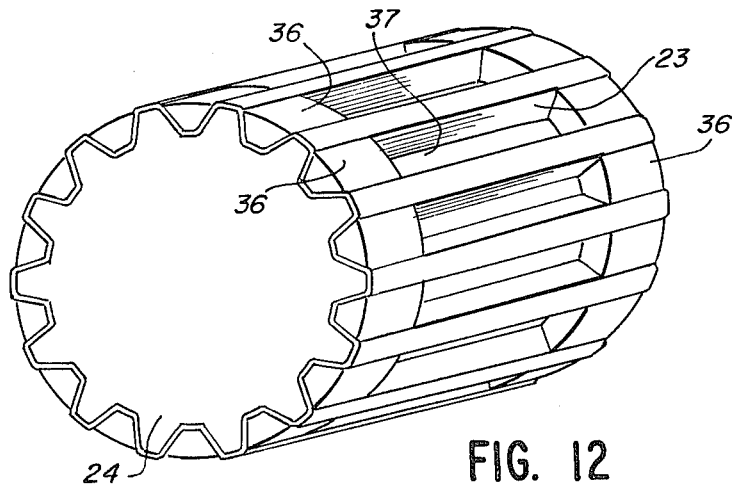
FIG. 12 is a perspective view illustrating the mounting of the modified form of belt sleeve on the inner mold.

Thus, as seen in FIG. 12, when the fabric 23, with the filler end pieces 36 provided therein, is installed on the inner mold 24, the end pieces are disposed at the opposite ends of the grooves 37 whereby the fabric is secured positively to the mold to provide further maintained shape of the fabric in the subsequent molding operation.

Figure 9:
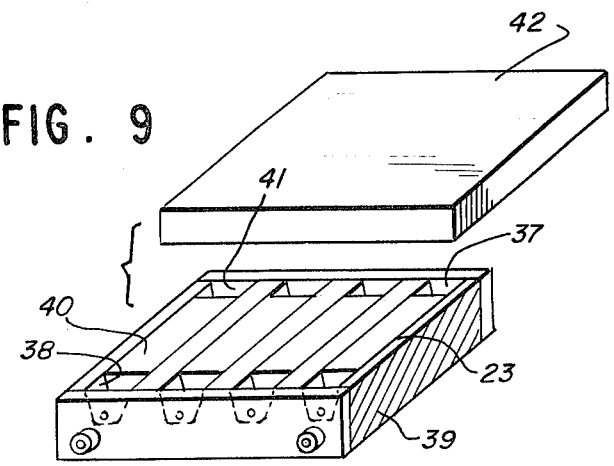
FIG. 9 is a perspective view of an apparatus for use in forming the belt sleeve by a modified method.
Figure 10:
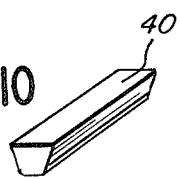
FIG. 10 is a perspective view of an insert utilized in the forming method illustrated in FIG. 9.

More specifically, as seen in FIG. 9, the preformed corrugated fabric 23 is fitted in a corrugated upper surface portion 38 of a mold 39. Mold strips 40 are inserted in the midportion of each of the grooves 37, leaving molding spaces 41 at the opposite ends thereof in the grooves for receiving liquid polyurethane. An upper mold plate 42 is placed over the lower mold 39, permitting pressure and heat to be applied to the mold from externally thereof to harden the polyurethane in the end spaces 41 and thereby define the end pieces 36 illustrated in FIG. 11.

Figure 11:
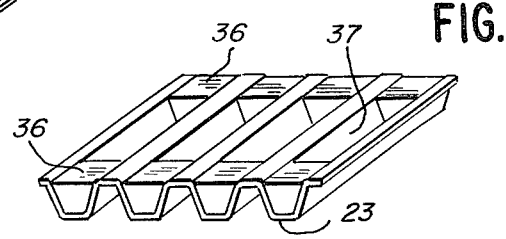
FIG. 11 is a perspective view of a portion of the modified belt sleeve.

Upon setting of the end pieces 36, the upper mold plate 42 and mold strips 40 are removed, permitting the fabric 23 having the end piece 36 provided therein, as shown in FIG. 11, to be removed for installation on the mold 24, as illustrated in FIG. 12.

As in the embodiment of FIGS. 1–8, the groove surface of mold 24 is first sprayed with a thin layer of polyurethane elastomer before installing the fabric 23 in the grooves thereof. When the corrugated fabric 23 is installed in the grooves, the end pieces 36 serve to effectively positively urge the fabric accurately into the grooves at the end portions thereof, thereby providing further improved coordination of the configuration of the fabric with the desired V-belt toothed configuration defined by the mold 24.

The rope tension member 32 is wound about the fabric with the end pieces 36 disposed therein in a manner similar to the winding of the tensile cord illustrated in FIG. 5. Completion of the molding of the belt sleeve is effected by setting of additional polyurethane in association therewith, generally as illustrated in FIGS. 6 and 7 of the first embodiment. The belt sleeve of the second embodiment differs from that of the first embodiment in the provision of the polyurethane end pieces which are preformed in the opposite ends of the grooves 37 prior to the final molding of the polyurethane elastomer thereabout in the steps illustrated in FIGS. 6 and 7 of the first embodiment.

The final V-belts are cut from the belt sleeve to have the desired width, as illustrated in FIG. 8.

INDUSTRIAL APPLICABILITY

The belt sleeve 15 of the present invention provides a highly accurate tooth configuration wherein the fabric 13 is caused to define accurately the desired inner tooth surface configuration without bubbles, creases, etc. By setting the fabric in the grooves 25 of the inner mold 24 while applying pressure thereto through the mold 27, the inner mold 24 effectively defines a mold for accurately molding and positioning the corrugated fabric 23 so as to define the desired tooth reinforcing fabric configuration 13.

Further, as the reinforcing fabric 13 is set in the desired toothed inner surface configuration, long trouble-free life of the belt is secured by minimizing tendency for cracking of the teeth from the belt body as occurs in the belts of the prior art due to inaccurate confirmation of the fabric to the belt body teeth.

By preliminarily setting the fabric 23 in the corrugated configuration, initial conformity of the fabric to the mold grooves 25 is facilitated. Further, by means of the mold 27 and the additional thin film of settable resin applied to the surface of the mold 24 prior to the placement of fabric 23 thereabout, accurate maintained disposition of the corrugations 26 of fabric 23 with the groove surfaces of the mold is effected.

Thus, when the settable belt material is poured into the spaces 34 and 35, as seen in FIG. 6, the fabric is maintained accurately in conformity with the mold tooth surfaces 25 to assure accurate conformity of the reinforcement fabric 13 to the desired toothed configuration for improved, long troublefree life in the drive system.

The belt sleeves formed by each of the two embodiments disclosed above provide substantially improved accuracy of the fabric configuration on the belt teeth in a novel and simple manner, as discussed.

The foregoing disclosure of specific embodiments is illustrative of the broad inventive concepts comprehended by the invention.

I claim:

1. The method of manufacturing a toothed belt sleeve comprising the steps of:
   providing a cylindrical mold having a plurality of longitudinal circumferentially spaced grooves;
   providing a thin layer of settable material on the mold surface;
   preforming a fabric to define a corrugated reinforcement having projections complementary to said grooves;
   placing the corrugated fabric in fitted association in said mold grooves;
   urging the fabric forcibly against the mold to cause accurate fit of the fabric in said grooves;
   maintaining said urging while causing the settable material to at least partially set on the fabric corrugations;
   wrapping a tensile cord about the fabric-covered mold; and
   forming a belt body about the tensile cord and in the corrugations on the fabric.

2. The belt sleeve manufacturing method of claim 1 wherein said settable material comprises a synthetic resin.

3. The belt sleeve manufacturing method of claim 1 wherein said settable material comprises polyurethane elastomer resin.

4. The belt sleeve manufacturing method of claim 1 wherein said belt body is formed of a synthetic resin.

5. The belt sleeve manufacturing method of claim 1 wherein said belt body is formed of polyurethane elastomer resin.

6. The belt sleeve manufacturing method of claim 1 wherein each of said settable material and belt body comprises an elastomer.

7. The belt sleeve manufacturing method of claim 1 wherein said settable material comprises a heat settable material and said step of causing the settable material to at least partially set comprises a step of applying heat thereto.

8. The belt sleeve manufacturing method of claim 1 wherein said settable material comprises a heat settable material and said step of causing the settable material to at least partially set comprises a step of applying heat radially inwardly and outwardly thereto.

9. The method of manufacturing a toothed belt sleeve comprising the steps of:
   providing a cylindrical mold having a plurality of longitudinal circumferentially spaced grooves;
   providing a thin layer of settable material on the mold surface;
   preforming a fabric to define a corrugated reinforcement having projections complementary to said grooves;
   placing the corrugated fabric in fitted association in said mold grooves;
   urging a complementary presser into the corrugations of the fabric on the mold to cause accurate fit of the fabric in said grooves;
   maintaining said urging while causing the settable material to at least partially set on the fabric corrugations;
   removing the presser;
   wrapping a tensile cord about the fabric-covered mold; and
   forming a belt body about the tensile cord and in the corrugations on the fabric.

10. The belt sleeve manufacturing method of claim 9 wherein said presser comprises a plurality of rib elements interconnected by a flexible bond.

11. The belt sleeve manufacturing method of claim 9 wherein the steps of urging and maintaining said urging comprise applying steam pressure radially inwardly against said presser.

12. The method of manufacturing a toothed belt sleeve comprising the steps of:
   providing a cylindrical mold having a plurality of longitudinal circumferentially spaced grooves;
   providing a preform plate having a plurality of grooves corresponding to the grooves of said mold;
   urging a fabric against the grooved surface of said preform plate under conditions for forming the fabric in the configuration of the grooved surface;
   placing the formed fabric on the mold in accurate fit with the grooves thereof; and
   forming a belt body about the fabric on the mold.

13. The belt sleeve manufacturing method of claim 12 wherein settable fluid is applied to the fabric and caused to set thereon during said step of urging the fabric against said grooved surface of the preform plate.

14. The belt sleeve manufacturing method of claim 12 wherein settable fluid comprising a member selected from the group consisting of polyurethane elastomer resin, nitrile rubber with modified phenol resin, and epoxy resin is applied to the fabric and caused to set thereon during said step of urging the fabric against said grooved surface of the preform plate.

15. The method of manufacturing a toothed belt sleeve comprising the steps of:

providing a cylindrical mold having a plurality of longitudinal circumferentially spaced grooves;

providing a thin layer of settable material on the mold surface;

preforming a fabric to define a corrugated reinforcement having projections complementary to said grooves;

providing filler means in the grooves of the corrugated fabric;

placing the corrugated fabric in fitted association in said mold grooves with the filler pieces retained therein;

urging the fabric forcibly against the mold to cause accurate fit of the fabric in said grooves;

maintaining said urging while causing the settable material to at least partially set on the fabric corrugations;

wrapping a tensile cord about the fabric-covered mold; and forming a belt body about the tensile cord and in the corrugations on the fabric.

16. The belt sleeve manufacturing method of claim 15 wherein the filler pieces are formed in situ in the grooves of the corrugated fabric.

17. The belt sleeve manufacturing method of claim 15 wherein said filler pieces and belt body are formed of similar elastomer resin.

18. The belt sleeve manufacturing method of claim 15 wherein said filler pieces and belt body are formed of polyurethane resin.

19. The belt sleeve manufacturing method of claim 15 wherein said filler pieces are provided at opposite ends of the grooves of the corrugated fabric.

20. The belt sleeve manufacturing method of claim 15 wherein said filler pieces and belt body are formed of heat settable synthetic resin and are formed by application of heat and pressure thereto.

* * * * *